(12) United States Patent
El Assad et al.

(10) Patent No.: US 8,781,116 B2
(45) Date of Patent: Jul. 15, 2014

(54) GENERATOR OF CHAOTIC SEQUENCES AND CORRESPONDING GENERATING SYSTEM

(75) Inventors: Safwan El Assad, Carquefou (FR); Hassan Noura, Nantes (FR)

(73) Assignee: Universite de Nantes, Nantes (FR)

( * ) Notice: Subject to any disclaimer, the term of this patent is extended or adjusted under 35 U.S.C. 154(b) by 116 days.

(21) Appl. No.: 13/638,126

(22) PCT Filed: Mar. 28, 2011

(86) PCT No.: PCT/FR2011/050670
§ 371 (c)(1),
(2), (4) Date: Mar. 26, 2013

(87) PCT Pub. No.: WO2011/121218
PCT Pub. Date: Oct. 6, 2011

(65) Prior Publication Data
US 2013/0170641 A1   Jul. 4, 2013

(30) Foreign Application Priority Data
Mar. 29, 2010 (FR) ..................................... 10 52288

(51) Int. Cl.
*G06F 21/00* (2013.01)
(52) U.S. Cl.
USPC .................................. 380/44; 380/28; 380/46
(58) Field of Classification Search
USPC ......................................................... 380/44
See application file for complete search history.

(56) References Cited

U.S. PATENT DOCUMENTS

| | | | | |
|---|---|---|---|---|
| 5,253,329 A | * | 10/1993 | Villarreal et al. | 706/31 |
| 6,744,893 B1 | * | 6/2004 | Fleming-Dahl | 380/263 |
| 7,218,733 B2 | * | 5/2007 | Li et al. | 380/28 |
| 2010/0002877 A1 | * | 1/2010 | Zhang | 380/46 |

OTHER PUBLICATIONS

Jakimoski et al., "Chaos and cryptography: block encryption ciphers based on chaotic maps", Feb. 2001, IEEE Transactions on Circuits and Systems I: Fundamental Theory and Applications, vol. 48, Issue: 2, pp. 163-169.*
Safwan El Assad et al. "Design and Analyses of Efficient Chaotic Generators for Crypto-Systems", in Advances in Electrical and Electronics Engineering IAENG Special Edition of the World Congress on Engineering and Computer Sciences 2008, vol. 1, pp. 3 to 12.*
El Assad et al., "Design and Analyses of Efficient Chaotic Generators for Crypto-systems" Advances in Electrical and Electronics Engineering—Iaeng Special Edition of the World Congress on Engineering and Computer Science 2008, WCECS '08. IEEE, Piscataway, NJ USA Oct. 22, 2008, pp. 3 to 12, XP031526532.

(Continued)

*Primary Examiner* — Morshed Mehedi
(74) *Attorney, Agent, or Firm* — Davidson, Davidson & Kappel, LLC

(57) ABSTRACT

A generator of chaotic sequences of integer values is provided. The generator includes at least two discrete recursive filters at least of first-order, generating an output chaotic sequence of integer values, each recursive filter comprising means for implementing a nonlinear function connected via an exclusive-or gate to means for generating a perturbation sequence of integer values. The two filters are mounted in parallel. The chaotic sequence output from the generator is equal to an exclusive-or of the chaotic sequences output from the recursive filters, and in the means for implementing the nonlinear function includes a chaotic map.

12 Claims, 4 Drawing Sheets

(56) References Cited

OTHER PUBLICATIONS

Tkacik, Thomas, "A Hardware Random Number Generator" Crpytographic Hardware and Embedded Systems. Internationalworkshop. Aug. 13, 2002, pp. 450-453, XP001160535.

Shujun Li et al., "Statistical Properties of Digital Piecewise Linear Chaotic Maps and Their Roles in Cryptography and Pseudo-Random Coding" Cryptography and Coding: 8th IMA International Conference, Cirencester, UK. Dec. 17 to 19, 2001. Springer-Verlag, Heidelberg, DE. vol. 2260, Dec. 17, 2001, pp. 205-221, XP007917061.

Azzinnari L et al., "A Simple Digital FPGA Psuedo-Chaos Generator" Circuit Paradigm in the 21st Century: ECCTD '01, Proceedings of the 15th European Conference on Circuit Theory and Design, Helsinki University of Technology, Espoo, Finland. Aug. 28 to 31, 2001. vol. 3, Aug. 28, 2001, pp. 25 to 28, XP007917063.

Martin Hasler et al., "An Introduction to the Synchronization of Chaotic Systems: Coupled Skew Tent Maps" IEEE Transactions on Circuits and Systems Part I: Regular Papers, IEEE Service Center, New York, NY, USA. vol. 44, No. 10, Oct. 1, 1997, pp. 856-866, XP011011631.

Shujun Li et al., "Pseudo-random Bit Generator Based on Couple Chaotic Systems and Its Applications in Stream-Cipher Cryptography" Progress in Cryptology: Proceedings Indocrypt 2001, Second International Conference on Cryptology in India, Chennai, India, Dec. 16 to 20, 2001. vol. 2247, Dec. 16, 2001, pp. 316-329, XP007917060.

\* cited by examiner

GENERATOR OF CHAOTIC SEQUENCES AND CORRESPONDING GENERATING SYSTEM

The present invention concerns a generator generating chaotic sequences of integer values.

BACKGROUND

It also concerns a system for generating chaotic sequences, an encrypting system, a method for measuring the orbit length of a discrete chaotic sequence and a computer program corresponding thereto.

More particularly, the invention relates to the field of secure data sharing, transmission and storage in data transmission networks.

The transfer of confidential data (company documents, medical information, research results, personal data of photo, video type, etc.) in an open environment using usual communication channels (cables, Internet, Mobile-radios, satellites, . . . ) must be performed with maximum security and at a sufficient transfer rate. For this purpose, crypto-systems based on chaotic signals are adequate for achieving the cited objectives. A determinant factor in any chaos-based cryptosystem is the generator of the chaotic sequences, which is used for the generation of secrete keys and for data enciphering/deciphering procedure in substitution and permutation operations. The confidentiality of data depends inter alia on the extent of the chaos (i.e. randomness) of the sequences produced by the chaotic sequence generator used.

However, chaotic signals have not been given wide use in state of the art encryption systems on account of their periodicity in cycles of fairly small finite lengths.

The document "Design and Analyses of Efficient Chaotic Generators for Crypto-Systems" by Safwan El Assad et al. in Advances in Electrical and Electronics Engineering IAENG Special Edition of the World Congress on Engineering and Computer Sciences 2008, Vol. 1, pages 3 to 12, describes a generator of integer value chaotic sequences particularly intended to form data encryption keys, the said generator comprising at least two discrete recursive filters at least of first-order generating an output chaotic sequence of integer values, each recursive filter comprising means to implement a nonlinear function connected via an exclusive-or gate to means for generating a perturbation sequence.

SUMMARY OF THE INVENTION

In the aforementioned document, the two recursive filters are mounted in series which leads to long computing times for the generation of the chaotic sequences.

An objective of the present invention is to solve this problem by reducing long computing times for the generation of the chaotic sequences.

For this purpose, the subject of the invention is a generator of chaotic sequences $e_u(n)$, n being a strictly positive integer, having integer values represented on a determined number of quantification bits N, intended in particular to form data encrypting keys, the generator comprising at least two discrete recursive filters at least of first-order generating an output chaotic sequence of integer values, each recursive filter comprising means to implement a nonlinear function F, connected via an exclusive-or gate to means for generating a perturbation sequence $Q(n)$ of integer values represented on a determined number of quantification bits k, characterized in that the two filters are mounted in parallel, the chaotic sequence $e_u(n)$ output from the generator being equal to an exclusive-or of the chaotic sequences output from the recursive filters, and in that the means for implementing the nonlinear function comprise a chaotic map.

According to other aspects of the invention, the generator of chaotic sequences may include one or more of the following characteristics:

- the means for generating a perturbation sequence in each filter comprise a maximum length feedback shift register using a primitive polynomial of degree k;
- the order of each recursive filter is third-order or lower;
- the means for implementing the nonlinear function comprise a piece-wise linear chaotic map PWLCM;
- the sequences $e_{uj}(n)$ output from each recursive filter j=1, 2 are given by the equation:

$$e_u(n) = F(X_j(n-1), P) \oplus Q(n)$$

where:

$$F(X_j(n-1), P) = \begin{cases} \left\lfloor \dfrac{2^N \times X_j(n-1)}{P} \right\rfloor & 0 \le X_j(n-1) \le P \\ \left\lfloor \dfrac{2^N \times [X_j(n-1) - P]}{2^{N-1} - P} \right\rfloor & P \le X_j(n-1) \le 2^{N-1} \\ \left\lfloor \dfrac{2^N \times [2^N - 1 - X_j(n-1) - P]}{2^{N-1} - P} \right\rfloor & 2^{N-1} \le X_j(n-1) \le 2^N - P \\ \left\lfloor \dfrac{2^N \times [2^N - 1 - X_j(n-1)]}{P} \right\rfloor & 2^N - P \le X_j(n-1) \le 2^N \end{cases}$$

with $$X_j(n-1) = \mathrm{mod}[k_{uj}(n-1) + c_{j1} \times e_{uj}(n-1) + c_{j2} \times e_{uj}(n-2) + c_{j3} \times e_{uj}(n-3), 2^N]$$

where:

- P is a control parameter whose value is less than $2^{N-1}$,
- $k_{uj}(n)$ is the input sequence of the recursive filter j,
- $c_{j1}, c_{j2}, C_{j3}$ represent the coefficients of the recursive filter j,
- the operation $\lfloor x \rfloor$ consists of computing the largest integer equal to or smaller than x,
- the operation $\mathrm{mod}(X, 2^N)$ consists of performing the modulo $2^N$ of X, and
- the means for implementing the nonlinear function comprise a chaotic map of <<SKEW-Tent>> type.

The present invention also provides a system for generating chaotic sequences comprising at least one assembly of 14 generators of chaotic sequences according to the invention, the said generators being divided into two groups of 7 generators each, characterized in that it comprises:

- a first analogue multiplexer allowing the selection of the output of a first generator from among the generators of the first group;
- a second analogue multiplexer allowing the selection of the output of a second generator from among the generators of the second group; the outputs of the two multiplexers being connected to an exclusive-or gate generating an output chaotic sequence; and means for addressing the multiplexers comprising a feedback shift register connected to a clock whose period is a function of the length of the chaotic sequence.

According to other aspects of the invention, the system for generating chaotic sequences may include one or more of the following characteristics:

it comprises two assemblies mounted in parallel each having 14 chaotic sequence generators, the chaotic sequence generated at the output of the generating system being equal to an exclusive-or of the chaotic sequences generated at the outputs of the two assemblies of 14 generators;

the primitive polynomials of the feedback shift registers of the first assembly of generators are different from the primitive polynomials of the feedback shift registers of the second assembly of generators;

it comprises means for eliminating a determined quantity of samples of the chaotic sequences generated by the system; and it comprises means for quantifying the generated chaotic sequences.

The present invention also provides an encryption system, characterized in that it comprises a said system for generating chaotic sequences, the said system for generating chaotic sequences being used to generate secret keys and in enciphering/deciphering procedures of the encryption system.

The present invention also provides a method for measuring the orbit length, formed of a transient and a cycle, of a discrete chaotic sequence of samples, the length of the said orbit being equal to the sum of the lengths of the transient and cycle of the sequence, characterized in that it comprises the steps of:

generating an initial sub-sequence consisting of a determined number $N_t$ of samples of the chaotic sequence;

solely if the sub-sequence does not comprise any cycle, the iterative generating of a following sub-sequence consisting of a determined number $N'_t$ of samples of the chaotic sequence until the global sub-sequence formed of all the generated sub-sequences comprises a cycle; and computing the orbit length of the chaotic sequence from the lengths of the transient and of the cycle of the global sub-sequence.

The present invention further provides a method for measuring the value of the orbit of a discrete recursive filter of the chaotic sequence generator according to the invention, characterized in that it comprises the steps of the aforementioned measuring method.

Finally, the present invention provides a computer program comprising code instructions which, when this program is run on a computer, allow the implementing of the steps of a said measuring method.

With the present invention it may be therefore possible to overcome the shortcomings of the chaotic sequence generator in the above-cited document by proposing parallel mounting of the two recursive filters of the generator.

In addition, since the system for generating chaotic sequences of the invention comprises a plurality of generators of chaotic sequences, it allows the generation of discrete chaotic signals having very long periods possibly reaching several centuries. This is of major importance for securitizing data since with such non-repetitive chaotic sequences it is possible to generate encrypting keys of very large size.

In addition, the method for measuring the orbit length of a chaotic sequence according to the present invention, allows the precise measurement of the orbit length of any chaotic sequence rapidly and efficiently.

BRIEF DESCRIPTION OF THE DRAWINGS

A more precise but non-limiting description will now be given of embodiments of the invention with reference to the appended drawings in which.

DETAILED DESCRIPTION

Figure 1:
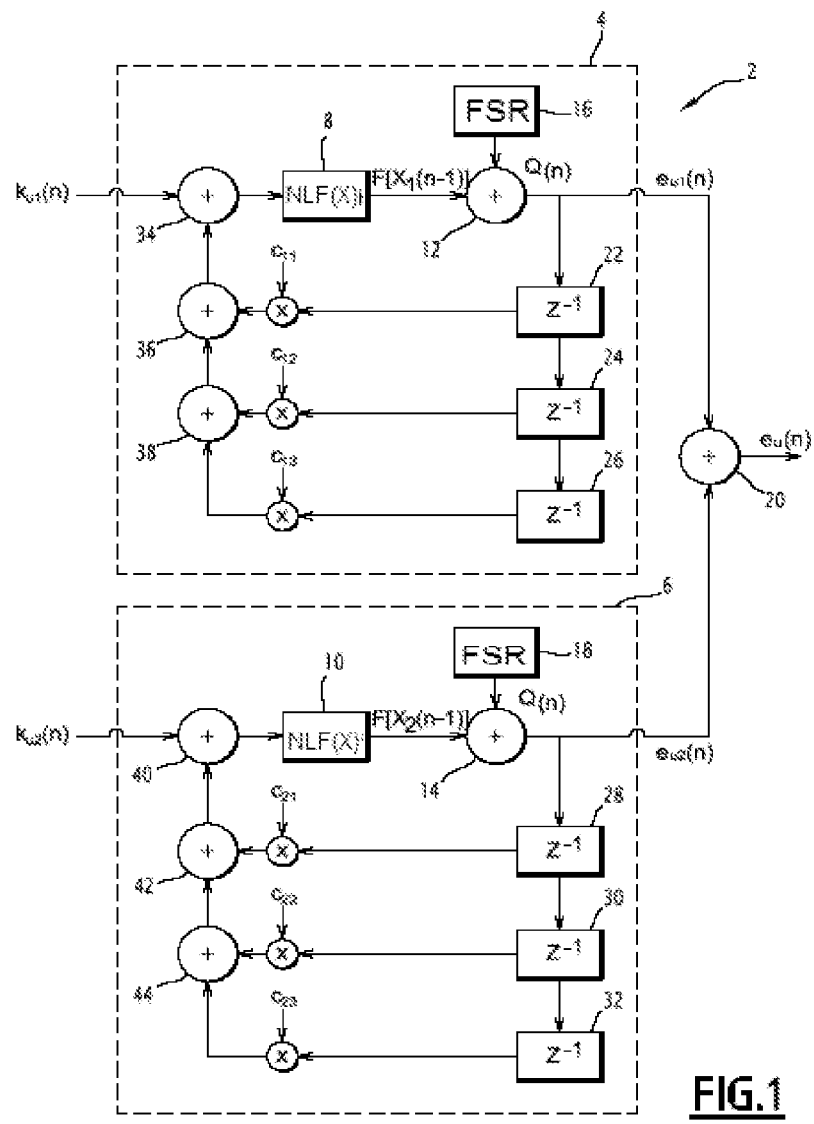
FIG. 1 is a block diagram illustrating the structure and functioning of a generator of chaotic sequences according to the invention.

FIG. 1 illustrates a generator 2 generating chaotic sequences $e_u(n)$, n being a strictly positive integer, having integer values represented on a determined number N of quantification bits.

The generated chaotic sequence $e_u(n)$ is particularly intended to form data encrypting keys and to be used in enciphering/deciphering procedures of substitution and permutation operations for secure sharing, transmitting and storing of data.

The generator 2 comprises at least two discrete recursive filters 4 and 6 at least of first-order and preferably third-order as in FIG. 1. It is possible however to use recursive filters 4 and 6 of first- or second-order.

The output of the first recursive filter 4 generates a chaotic sequence $e_{u1}(n)$ of integer values.

The output of the second recursive filter 6 generates a chaotic sequence $e_{u2}(n)$ of integer values.

The recursive filters 4, 6 comprise means for implementing a nonlinear function F 8, 10 respectively connected via an exclusive-or gate 12, 14 to means for generating a respective perturbation sequence Q(n) 16, 18.

The means for generating a perturbation sequence 16, 18 in the recursive filters 4, 6 respectively comprise a Maximal-Length Linear Feedback Shift Register (m-LFSR) 16, 18.

The role of the perturbation sequence will be described in more detail with reference to FIG. 2.

According to the invention, the two recursive filters 4 and 6 are mounted in parallel so that the chaotic sequence $e_u(n)$ output from the generator 2 is equal to an exclusive-or 20 of the chaotic sequences $e_{u1}(n)$ and $e_{u2}(n)$ output from the recursive filters 4, 6.

The two recursive filters 4, 6 comprise free inputs $k_{u1}(n)$ and $k_{u2}(n)$ respectively.

With respect to third-order recursive filters 4, 6 as illustrated in FIG. 1, each of the filters 4, 6 comprises three delays 22, 24, 26 and 28, 30, 32, respectively three gain multiplier operators $c_{11}$, $c_{12}$ and $c_{13}$ for the first recursive filter 4 and $c_{21}$, $c_{22}$, $c_{23}$ for the second recursive filter 6 and three modulo $2^N$ adders 34, 36, 38 et 40, 42, 44 respectively.

The means for implementing a nonlinear function 8, 10 comprise circuits using the x log x function or the x exp[cos (x)] function or else a Chebyshev map or a SKEW-Tent map or a Piecewise Linear Chaotic Map (PWLCM).

The simulations conducted by the inventors indicate that it is the PWLCM map which gives the best results in terms of efficacy for cryptanalysis and simplicity of performance.

In the embodiment shown FIG. 1 using a PWLCM map, the output $e_u(n)$ of the generator 2 verifies the equation $e_u(n)=e_{u1}(n)\oplus e_{u2}(n)$ in which $$e_{uj}(n) \underset{j=1,2}{=} [X_j(n-1), -P]Q \oplus (n)$$

where:

$$F\left[X_j(n-1), P\right]_{j=1,2} = \begin{cases} \left\lfloor \dfrac{2^N \times X_j(n-1)}{P} \right\rfloor & 0 \leq X_j(n-1) \leq P \\ \left\lfloor \dfrac{2^N \times [X_j(n-1) - P]}{2^{N-1} - P} \right\rfloor & P \leq X_j(n-1) \leq 2^{N-1} \\ \left\lfloor \dfrac{2^N \times [2^N - 1 - X_j(n-1) - P]}{2^{N-1} - P} \right\rfloor & 2^{N-1} \leq X_j(n-1) \leq 2^N - P \\ \left\lfloor \dfrac{2^N \times [2^N - 1 - X_j(n-1)]}{P} \right\rfloor & 2^N - P \leq X_j(n-1) \leq 2^N \end{cases}$$

with:

$$X_j(n-1) \underset{j=1,2}{=}$$
$$\operatorname{mod}[k_{uj}(n-1) - e_{j1} + e_{uj}(n \times 1) - e_{j2} + e_{uj}(n \times 2) - e_{j3} + e_{uj}(n \times 3), -2^N]$$

where P is a control parameter verifying $0<P<2^{N-1}$,
$k_{uj}(n)$ is the input sequence of the recursive filter j,
$c_{j1}, c_{j2}, c_{j3}$ are the coefficients of the recursive filter j,
the operation $\lfloor X \rfloor$ computes the largest integer that is equal to or smaller than x («Floor» function) and the operation $\operatorname{mod}(X, 2^N)$ consists of performing the modulo $2^N$ of X.

The generator 2 produces non-real, integer chaotic values. This of prime importance since, in this case, the emitted and received values only depend on the chosen number N and not on the precision of the computing means used. Otherwise, the secret key could be given a different interpretation on reception than on emission and having regard to the extreme sensitivity of the secret key system there is a risk that the values generated on emission and reception may be different. It is to be noted however that the discretizing operation degrades the chaotic dynamics of the initial chaotic map (before discretization) since: $X(n) \neq 2^N \times x(n)$ where $x(n) \in R\{0,1\}$ where $R\{0,1\}$ designates all real numbers between 0 and 1.

The cascade technique of two recursive filters in parallel allows the length of the cycle to be increased compared with the use of a single filter. If $l_1$ is used to designate the length of the cycle of the first filter 4 and $l_2$ the length of the cycle of the second filter 6, then the length l of the generator cycle composed of two recursive filters in parallel is the least common multiple (lcm) of $l_1$ and $l_2$, i.e.:

$$l = lcm(l_1, l_2)$$

with $1 \leq l_1 \leq (2^N-1)^3$, $1 \leq l_2 \leq (2^N-1)^3$.
If the greatest common divisor (gcd) of $l_1$ and $l_2$ is unitary, i.e.

$$\gcd(l_1, l_2) = 1$$

then:

$$l = l_1 \times l_2.$$

In addition, the generator 2 integrates a perturbation technique of the chaotic orbit which not only allows the solving of the problem of the degradation of chaotic dynamics, but also considerably increases cycle lengths and ensures maximum security.

Figure 2:
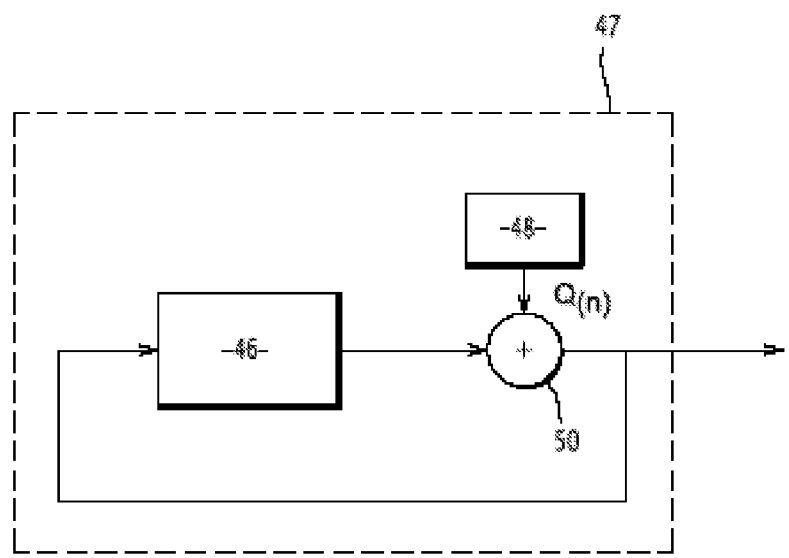
FIG. 2 is a block diagram illustrating the principle of chaotic sequence perturbation.

FIG. 2 illustrates the principle of the perturbation of a chaotic sequence generated by a standard chaotic generator such as a PWLCM 46 map that is part of a first-order recursive filter 47.

The perturbation sequence Q(n) generated using a maximum length feedback shift register 48 has the role of perturbing the chaotic orbit of the generator 46 enabling it to access a new orbit.

The feedback shift register 48 uses a primitive polynomial of degree k, so that the generated perturbation sequence Q(n) is represented on k bits.

The register 48 is characterized by good auto-correlation function, near-uniform distribution, a cycle of maximum length $2^k-1$ and easy software or material implementation. Starting from the equation of the generator 46:

$$X(n) = F[X(n-1)] \in 2^N-1 \quad n=1, 2, \ldots$$

where each value X(n) is represented by N bits:

$$X(n) = x_{N-1}(n)x_{N-2}(n) \ldots x_i(n) \ldots x_{0(n)}, x_i(n) \in A_b = [0,1]$$

$i = 0, 1, \ldots N-1$.

In addition, by denoting $\Delta$ the clock of the register 48, the perturbation is only applied to the chaotic sequence generated by the generator 46 if $n = m \times \Delta$ where m is an integer i.e. with $n=0$ and at every $\Delta$ iteration. The clock $\Delta$ of the register 48 therefore represents the minimum cycle of the recursive filter 47 without perturbation.

Effectively, if:

$$e_{uj}(n) = x_{j,N-1}(n)x_{j,N-2}(n) \ldots x_{j,i}(n) \ldots x_{j,0}(n)$$

$$x_{j,i}(n) \in A_b = [0, 1]$$

$$i = 0, 1, \ldots N$$

$$1; -j, 1 = 2$$

then:

$$x_{j,i}(n) = \begin{cases} F[x_{j,i}(n-1), P] & k \leq i \leq N-1 \\ F[x_{j,i}(n-1), P] \oplus Q_i(n) & 0 \leq i \leq k-1 \end{cases}$$

where $F[x_{j,i}(n-1)]$ represents the -th bit of $F[x_j(n-1)]$ and $Q_i(n)$ represents the -th bit of the perturbation sequence such that:

$$Q_{k-1}^+(n) = Q_k(n)g_0Q_0(n) \oplus g_1Q_1(n) \oplus \ldots g_{k-1}Q_{k-1}(n)$$

where $n=0,1,2,\ldots,[g_0, g_1, g_{k-1}]$ are the coefficients of the primitive polynomial of the shift register 48 and $[Q_0, Q_1, Q_{k-1}]$ represents the initial nonzero value of the register 48. It is to be noted that the perturbing sequence is applied to the k low weight bits of $F[X(n-1)]$. If $n \neq m \times \Delta$, $m=0, 1, 2, \ldots$, the output of the generator of the chaotic sequences is not perturbed, therefore:

$$X(n)=F[X(n-1)]$$

The period of the perturbed recursive filter 47 is given by:

$$L=\sigma \times \Delta \times (2^k-1)$$

where $\sigma$ is a positive integer. The minimum period of the perturbed recursive filter 47 is then:

$$L_{min}=\Delta \times (2^k-1).$$

In addition, the amplitude of the perturbing sequence Q generated by the feedback shift register 48 is distinctly smaller than that of the chaotic sequence generated by the generator 46 so that the ratio R between the two maximum amplitudes is equal to or greater than 40 dB:

$$R = 20 \log \left[ \frac{\text{Maximum amplitude of the chaotic signal}}{\text{Maximum amplitude of the perturbing signal}} \right] \geq 40 \text{ dB}.$$

Figure 3:
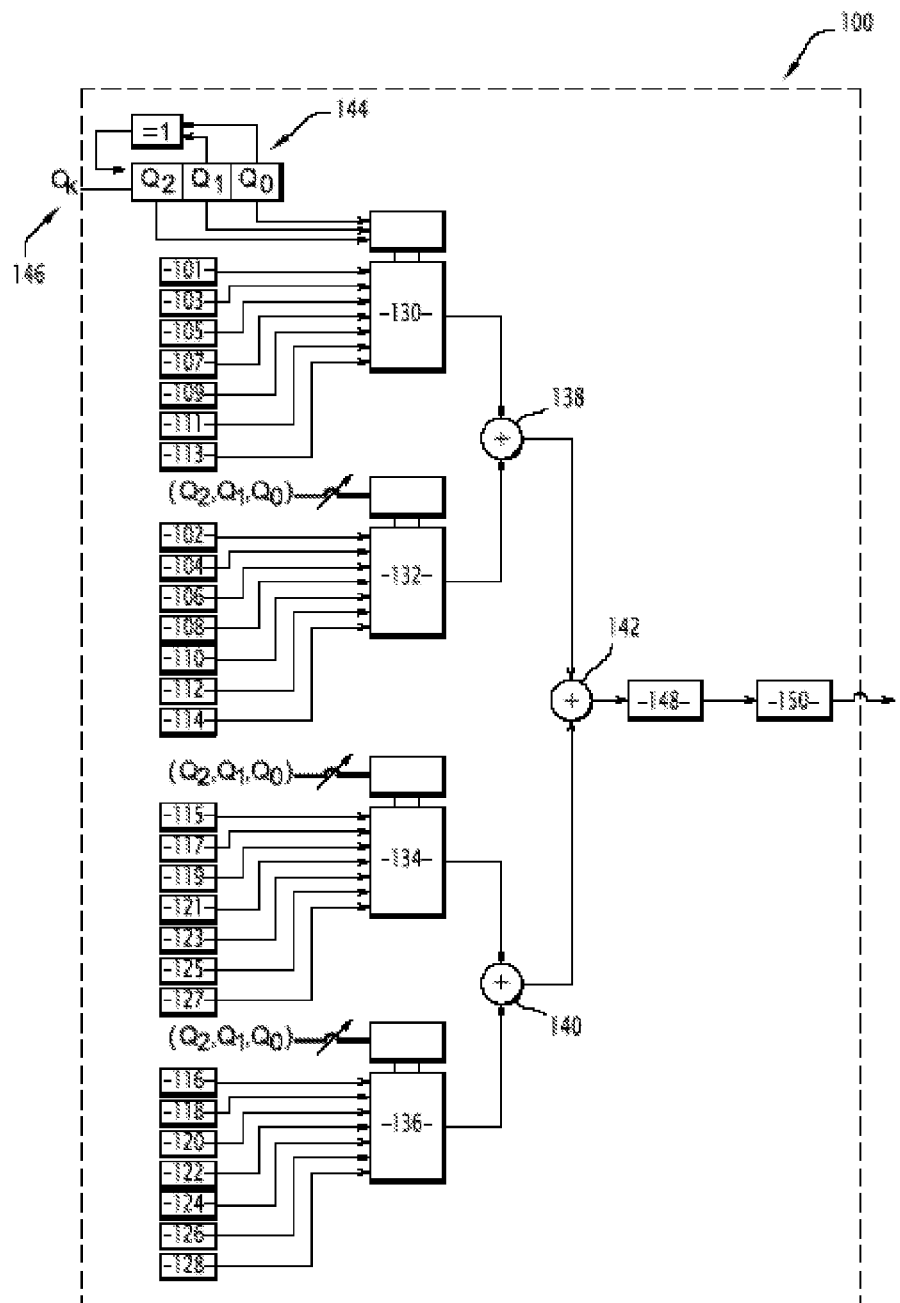
FIG. 3 is a block diagram illustrating the structure and functioning of a system for generating chaotic sequences according to the invention.

FIG. 3 illustrates the structure of a system 100 for generating chaotic sequences according to the invention.

The generating system 100 comprises twenty-eight generators 101 to 128 of chaotic sequences similar to the generator 2 in FIG. 1.

The 28 generators 101 to 128 are divided into two assemblies of generators, the first assembly comprising the 14 generators 101 to 114 and the second assembly comprising the 14 generators 115 to 128.

Each assembly of 14 generators comprises two groups of 7 generators whose outputs are connected to the inputs of an 8-to-1 analogue multiplexer.

Therefore, the outputs of the generators 101, 103, 105, 107, 109, 111 and 113 are connected to the inputs of a multiplexer 130 and the outputs of the generators 102, 104, 106, 108, 110, 112 and 114 are connected to the inputs of a multiplexer 132.

The outputs of the generators 115, 117, 119, 121, 123, 125 and 127 are connected to the inputs of a multiplexer 134 and the outputs of the generators 116, 118, 120, 122, 124, 126 and 128 are connected to the inputs of a multiplexer 136.

In addition, the outputs of the generators 130 and 132 are connected to an exclusive-or gate 138 and the outputs of the generators 134 and 136 are connected to an exclusive-or gate 140, the outputs of the two exclusive-or gates 138 and 140 being connected to an exclusive-or gate 142.

The multiplexers 130, 132, 134, 136 are connected to means for addressing the said multiplexers comprising a three-stage feedback shift register 144 connected to a clock $c_k$ 146.

The values of the bits in the three stages of the register 144 are denoted $Q_2$, $Q_1$, $Q_0$.

Also, according to one particular embodiment of the invention, the system 100 for generating chaotic sequences comprises means 148 for eliminating a determined quantity of samples of the chaotic sequences generated by the system, for example a percentage p % of samples.

The generating system 100 also preferably comprises means 150 for quantifying the generated chaotic sequences on a number of bits Nq lower than N.

The eliminating means 148 and the quantifying means 150 allow the size of the secret key to be increased, resulting in improved security.

Although FIG. 3 illustrates a generating system 100 comprising 28 chaotic generators, in another embodiment of the invention, not illustrated, only 14 chaotic generators are proposed which corresponds to a generating system consisting of one half of the system 100 in FIG. 3.

The expressions of the twenty-eight primitive polynomials P-G1 to P-G28 of the feedback shift registers for the perturbing of the 28 generators 101 to 128 respectively in FIG. 3, and of the primitive polynomial g of the feedback shift register FSR 144 used for addressing the multiplexers 130, 132, 134 and 136 are the following:

P-G1: $g_1(x)=x^{16}+x^{12}x^3+x+1$, or [16,12,3,1,0];

P-G3: $g_3(x)=x^{16}+x^{12}+x^7+x^2+1$

P-G5: $g_5(x)=x^{16}+x^9+x^5+x^2+1$

P-G7: $g_7(x)=x^{16}+x^{15}+x^9+x^4+1$

P-G9: $g_9(x)=x^{16}+x^{12}+x^9+x^6+1$

P-G11: $g_{11}(x)=x^{16}+x^{10}+x^7+x^6+1$

P-G13: $g_{13}(x)=x^{16}+x^9+x^4+x^3+1$

P-G2: $g_2(x)=x^{17}+x^3+1$

P-G4: $g_4(x)=x^{17}+x^{16}+x^3+x+1$

P-G6: $g_6(x)=x^{17}+x^8+x^7+x^6+x^4+x^3+1$

P-G8: $g_8(x)=x^{17}+x^9+x^8+x^6+x^4+x+1$

P-G10: $g_{10}(x)=x^{17}+x^7+x^4+x^3+1$

P-G12: $g_{12}(x)=x^{17}+x^{12}+x^6+x^3+x^2+x+1$

P-G14: $g_{14}(x)=x^{17}+x^{11}+x^8+x^6+x^4+x^2+1$

P-G15: $g_{15}(x)=x^{19}+x^5+x^2+x+1$

P-G17: $g_{17}(x)=x^{19}+x^{12}+x^{10}+x^9+x^7+x^3+1$

P-G19: $g_{19}(x)=x^{19}+x^{13}+x^8+x^5+x^4+x^3+1$

P-G21: $g_{21}(x)=x^{19}+x^{18}+x^{17}+x^{16}+x^{12}+x^7+x^6+x^5+x^3+x+1$

P-G23: $g_{23}(x)=x^{19}+x^9+x^8+x^7+x^6+x^3+1$

P-G25: $g_{25}(x)=x^{19}+x^{16}+x^{15}+x^{13}+x^{12}+x^9+x^5+x^4+x^2+x+1$

P-G27: $g_{27}(x)=x^{19}+x^{18}+x^{15}+x^{14}+x^{11}+x^{10}+x^8+x^5+x^3+x^2+1$

P-G16: $g_{16}(x)=x^{23}+x^5+1$

P-G18: $g_{18}(x)=X^{23}+x^{12}+x^5+x^4+1$

P-G20: $g_{20}(x)=x^{23}+x^{11}+x^{10}+x^7+x^6+x^5+1$

P-G22: $g_{22}(x)=x^{23}+x^{17}+x^{11}+x^5+1$

P-G24: $g_{24}(x)=X^{23}+x^{21}+x^7+x^5+1$

P-G26: $g_{26}(x)=x^{23}+x^5+x^4+x+1$

P-G28: $g_{28}(x)=X^{23}+x^{16}+x^{13}+x^6+x^5+x^3+1$

FSR: $g(x)=x^3+x+1$

The functioning of the system 100 for generating chaotic sequences is described in the remainder of the description with reference to FIG. 3.

First, the twenty-eight generators 101 to 128 and the feedback shift register 144 are initialized.

All the initial conditions and parameters of the different generators and of the different feedback shift registers of the system 100 form the size of the secret key.

Next, at each state j=1, 2, . . . 7 of the 3-stage register 144 the rate of which is determined by the clock $c_k$ 146, the length of the chaotic sequence at the output of the exclusive- or gate 142 is given by:

$$L_{j\,min_{j=1,2,\ldots,7}} = lcm[L_{j\,min1}, L_{j\,min2}]$$

where:
lcm indicates the least common multiple,
$L_{j\,min\,1}$ indicates the length of the chaotic sequence output from the exclusive-or gate 138 which is given by the equation:

$$L_{j\,min\,1_{j=1,2,\ldots,7}} = lcm\{[2^{k(2j-1)}-1] \times \Delta_{k(2j-1)}, [2^{k(2j)}-1] \times \Delta_{k(2j)}\}$$

where:
$\Delta_{k(2j-1)}$ and $\Delta_{k2j}$ respectively represent the periods of two selected generators without perturbation (from the first group formed of 14 generators 101 to 114) carrying the subscripts (2j−1)+100 and 2j+100 with j ranging from 1 to 7.

$L_{jmin2}$ indicates the length of the chaotic sequence output from the exclusive-or gate 140 which is given by the equation:

$$L_{j\,min2_{j=1,2,\ldots,7}} = lcm\{[2^{k(14+2j-1)}-1] \times \Delta_{k(14+2j-1)}, [2^{k(14+2j)}-1] \times \Delta_{k(14+2j)}\}$$

where:
$\Delta_{k(14+2j-1)}$ and $\Delta_{k(14+2j)}$ respectively represent the periods of two selected generators without perturbation (from the second group formed of 14 generators 115 to 128) carrying the subscripts (14+2j−1)+100 and (14+2j)+100 with j ranging from 1 to 7.

The period of the clock $c_k$ 146 of the 3-stage register 144 is given by:

$$L_{Ck} = \text{Min}(L_{j\,min_{j=1,2,\ldots,7}})$$

The minimum length of the chaotic sequence generated at the output of the sample eliminating means 148 is therefore given by:

$$L_{min} \times = 7 L_{Ck}[1p\,\%].$$

This is an extremely long length.

Indeed, the value of the nominal cycle $\Delta_{nom}$ of a conventional, non-perturbed generator of chaotic sequences is of the order of $\Delta_{nom} \cong \sqrt{(2^N)^3} = 2^{3N/2} = 2^{48}$ with N=32.

The article by O. E. Lanford III "Informal Remarks on the Orbit Structure of Discrete Approximation to Chaotic Maps" in Experimental Mathematics, 1998, vol. 7, n° 4, pp 317-324 gives the above value of $\Delta_{nom}$. Additionally, this value is also verified by the orbit measuring method of the invention.

The minimum length of the cycle of the perturbed recursive filter 47 (for a minimum degree k=16 of the FSR register 48) is then:

$$l_{min} \cong \Delta_{nom} \times 2^{16} \cong 2^{64}$$

Therefore, the length of the chaotic sequence is given by: $L_{min} = 7 \times 2^{128}$ samples which is colossal, the age of the universe being of the order of $10^{10}$ years.

With a said chaotic sequence, it is possible to encipher practically $10^{32}$ different images, the size of each one being $3 \times 1024 \times 1024 \times 32$ bits.

This chaotic sequence is therefore ideal for use as a disposable mask for ultra-secret communication channels such as the "red phone hot line".

Also, the size of the secret key is very large compared with the keys of prior art generators of pseudo-random signals. It is formed of all the initial conditions and the parameters of the different generators and of the different feedback shift registers. On this account, the different types of attacks (exhaustive, chosen plaintext, chosen cipher text . . . ) are practically impossible to carry out.

Each perturbed generator has a sub-key composed of:
6 initial conditions i.e. 6×N bits,
6 parameters i.e. 6×N bits,
2 $k_u$ inputs i.e. 2×N bits.
The register 144 has a sub-key composed of:
the initial condition on $N_1$=16 bits minimum, and
$\Delta$ on $N_2$=64 bits minimum
Also, 5 bits are needed including 2 bits to indicate the multiplexer used (1 from among 4) followed by 3 bits to signal the perturbed generator used (1 from among 7) at the input of the multiplexer under consideration.

Three bits are also needed as initial condition for the register 144 which addresses the multiplexers 130, 132, 134, 136.

Finally, a minimum number of bits N3 #128 bits is needed for $L_{Ck}$.

The size of the secret key of the generating system 100 in FIG. 3 is therefore:

$$N_T \cong 28 \times [14 \times N + N_1 + N_2] + 128 = 14912 \text{ bits}$$

This is enormous. By way of indication, the complexity of an exhaustive attack for a key of 128 bits is approximately $2^{127}$ attempts or possible keys to identify the right key. Assuming that a computer is able to try one million keys per second, more than $5 \times 10^{24}$ years would be needed to find the right key.

Evidently, the size of the secret key may be smaller than above depending on the desired application.

Figure 4:
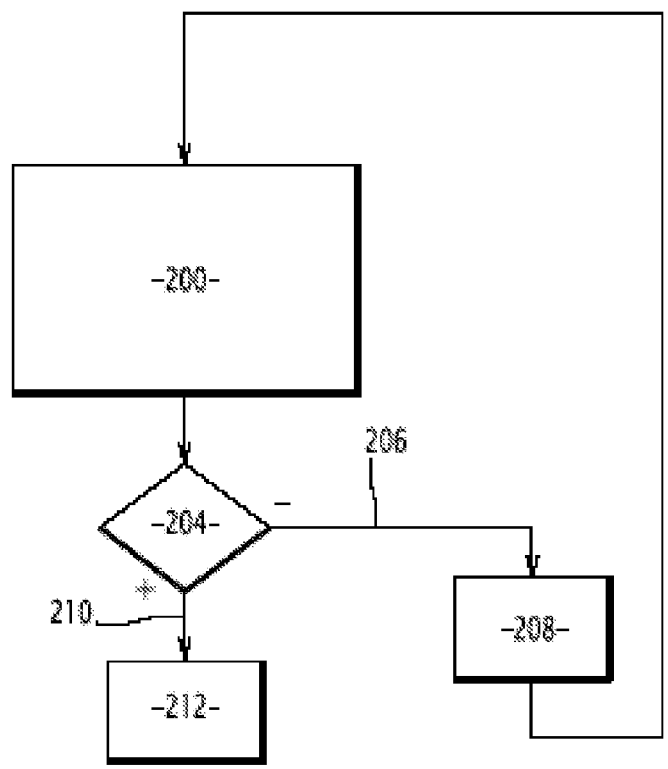
FIG. 4 is a flow chart illustrating the functioning of the method for measuring the orbit length of a chaotic sequence according to the invention.
Figure 5:
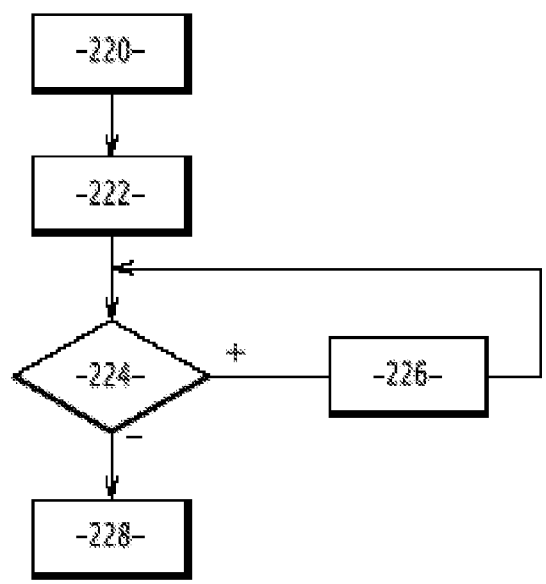
FIG. 5 is a flow chart illustrating the functioning of the method for measuring the orbit length of a chaotic sequence generated by a third-order recursive filter.

The remainder of the description given with reference to FIGS. 4 and 5 describes the functioning of the method for measuring the orbit length of a chaotic sequence according to the invention.

The orbit of a chaotic sequence is formed of two parts which are a transient and a cycle. The length of the chaotic orbit is denoted=c+1 where c is the cycle length and 1 is the transient length.

Several results have been given in the literature on this issue and on the simulation of the random numbers, without however indicating the measuring method used. These studies indicate inter alia that: for a number $N_o$ of different initial conditions, the mean number of different cycles is:

$$\overline{N}_c(N_0) = \sum_{k=1}^{N_0} \frac{1}{2k-1} \cong \frac{1}{2} Ln(N_0) + 0.98 \text{ with our } N_0 \geq 2.$$

Some initial conditions effectively do not generate different new cycles.

The generating system 100 illustrated in FIG. 3 generates cycles of lengths such that the measurement thereof is impossible.

The length of a perturbed recursive filter alone is of the order of $1_{pnom} \cong 2^{64}$.

It is therefore necessary to have available a method with which it is possible to measure chaotic orbits within a reasonable time.

The flow chart in FIG. 4 illustrates the functioning of the method for measuring the length of a chaotic orbit according to the invention.

At step 200, for each different initial condition and each parameter value, an initial sub-sequence consisting of a determined number $N_t$ of samples of the chaotic sequence is generated.

At step 204 it is tested whether or not the generated sub-sequence comprises a cycle. If, at step 206, the orbit of the generated sub-sequence consists solely of a transient, the generation process is continued at 208 by generating at 200 a following sub-sequence consisting of a determined number $N'_t$ of samples of the chaotic sequence.

Preferably $N'_t = N_t$ so that the global sub-sequence obtained is of length $2N_t$.

The testing at 204 of the presence of a cycle is then recommenced and so forth until the global sub-sequence comprises a cycle at step 210.

Therefore, at a certain moment, the global sub-sequence of length $Ng = W \times N_t$ (where W is a positive integer) is composed of a transient and of a cycle of nonzero length.

At 212, the orbit length of the chaotic sequence is computed as being the sum of the lengths of the transient and of the cycle of the global sub-sequence.

The method in FIG. 4 is repeated for every initial condition and every parameter value.

A statistical analysis of the orbit lengths obtained is then used to set the nominal orbit value of the chaotic generator under consideration.

This method was applied to the PWLCM map alone with N=32 and to the case with the non-perturbed, third-order recursive filter 4, 6 in FIG. 1 with N=11.

With this choice it is possible to make a comparative analysis between the two configurations under consideration.

Step 212 of measuring the orbit length of the chaotic sequence generated by the non-perturbed, third-order recursive filter 4, 6 is described in more detail with reference to FIG. 5.

Since the recursive filter 4, 6 comprises three delays, the measurement of the orbit length of the chaotic sequence generated by this filter 4,6 comprises the search for occurrences of three successive values starting from the value of the last generated sample, i.e. sample Ng.

By denoting Ind(1) the address (in the vector line of the samples of size Ng) of the first cycle found and Ind(f) the address of the last cycle found, the length of the cycle is calculated at 220 as being c=Ng−Ind(1).

Then, at 222, the following calculation is performed: j=Ind(f)−1 and k=Ng−1.

At 224, a test is conducted on the equality of the values of the samples with addresses j and k.

If the values of the samples having addresses j and k are equal, then at 226 the values of j and k are decremented i.e. j=j−1 and k=k−1.

If the values of the samples having addresses j and k are different, then the value of the transient 1 is calculated at 228 as being equal to j, i.e. 1=j.

The length of the orbit is then o=c+1.

Table 1 summarizes the statistical results obtained with the non-perturbed recursive filter 4 for a number of initial conditions $N_o$=34489.

TABLE 1

| | |
|---|---|
| Number of different cycles | 22307 # $2^{14.44}$ |
| Number of different transients | 22476 # $2^{14.45}$ |
| Number of different orbits | 28049 # $2^{14.77}$ |
| Mean cycles | 24322 # $2^{14.57} > 2^{11+3}$ |
| Mean transients | 18690 # $2^{14.19} > 2^{N+d}$ |
| Mean orbits | 43237 # $2^{15.4} > 2^{N+1+d}$ |
| Maximum length of cycles | 39368737 # $2^{25.23}$ |
| Maximum length of transients | 429108 # $2^{18.71}$ |
| Maximum length of orbits | 39368742 # $2^{25.23}$ |
| Minimum length of cycles | 1 |
| Minimum length of transients | 2 |
| Minimum length of the orbits | 14 |

Table 2 gives the orbit, cycle and transient percentages obtained per interval of length.

TABLE 2

| Length interval | 0-9 | 10-99 | 100-999 | $10^3$-$10^4$−1 | $10^4$-$10^5$−1 | $10^5$-$10^6$−1 | $10^6$-$10^7$−1 | $10^7$-$10^8$−1 |
|---|---|---|---|---|---|---|---|---|
| Orbit % | 0 | 0.1479 | 2.5370 | 21.8852 | 70.4978 | 4.9001 | 0.0058 | 0.0261 |
| Cycle % | 0.1682 | 1.4497 | 9.9771 | 37.2438 | 50.3465 | 0.7829 | 0.0058 | 0.0261 |
| Transient % | 0.1769 | 1.5135 | 9.8089 | 36.9161 | 50.7785 | 0.8061 | 0 | 0 |

It is noteworthy that Table 2 shows that 70% of orbits are found in the length range of between $10^4$ and $10^5$, and 92% of orbits lie in the length range of between $10^3$ and $10^5$.

Tables 3, 4 and 5 give the number of cycles, transients and orbits and their corresponding frequencies.

TABLE 3

| Number of cycles | | | | | | | | | | | | | | |
|---|---|---|---|---|---|---|---|---|---|---|---|---|---|---|
| 15331 | 4228 | 1465 | 688 | 296 | 152 | 68 | 47 | 22 | 5 | 2 | 1 | 1 | 1 | 1 |
| Cycle-frequency 1 | 2 | 3 | 4 | 5 | 6 | 7 | 8 | 9 | 10 | 11 | 12 | 13 | 14 | 15 |

TABLE 4

| Number of transients | | | | | | | | | | | | | |
|---|---|---|---|---|---|---|---|---|---|---|---|---|---|
| 15638 | 4116 | 1485 | 624 | 297 | 178 | 67 | 34 | 15 | 10 | 8 | 2 | 1 | 1 |
| Transient-frequency 1 | 2 | 3 | 4 | 5 | 6 | 7 | 8 | 9 | 10 | 11 | 12 | 13 | 14 |

TABLE 5

| Number of orbits | 22799 | 4291 | 766 | 158 | 32 | 3 |
|---|---|---|---|---|---|---|
| Orbit-frequency | 1 | 2 | 3 | 4 | 5 | 6 |

Table 6 summarizes the statistical results obtained with the PWLCM map for the same number of initial conditions $N_o=34489$.

TABLE 6

| | |
|---|---|
| Number of different cycles | 27307 # $2^{14.73}$ |
| Number of different transients | 27203 # $2^{14.72}$ |
| Number of different orbits | 30027 # $2^{14.87}$ |
| Mean cycles | 32402 # $2^{14.98}$ |
| Mean transients | 32224 # $2^{14.97}$ |
| Mean orbits | 64626 # $2^{15.98}$ |
| Maximum length of the cycles | 1211239 # $2^{20.2}$ |
| Maximum length of the transients | 779792 # $2^{19.5727}$ |
| Maximum length of the orbits | 1317077 # $2^{20.33} < 2^{32} - 1$ |
| Minimum length of the cycles | 1 |
| Minimum length of the transients | 0 |
| Minimum length of the orbits | 107 |

Table 7 gives the orbit, cycle and transient percentages obtained per interval of length.

TABLE 7

| Length interval | 0-9 | 10-$10^2$-1 | $10^2$-$10^3$-1 | $10^3$-$10^4$-1 | $10^4$-$10^5$-1 | $10^5$-$10^6$-1 | $10^6$-$10^7$-1 | $10^7$-$10^8$-1 |
|---|---|---|---|---|---|---|---|---|
| Orbit % | 0 | 0 | 0.026 | 2.2645 | 81.9914 | 15.7152 | 0.0029 | 0 |
| Cycle % | 0.0174 | 0.2349 | 2.3196 | 21.1256 | 72.8783 | 3.4214 | 0.0010 | 0 |
| Transient % | 0.0261 | 0.2378 | 2.308 | 21.0879 | 73 | 3.3373 | 0 | 0 |

It is noteworthy, as shown in Table 7, that 82% of orbits are found in the length range of between $10^4$ and $10^5$, and about 98% of orbits are found in the length range of between $10^3$ and $10^6$.

Tables 8, 9 and 10 give the number of cycles, transients and orbits and their corresponding frequencies.

TABLE 8

| Number of cycles | 21415 | 4784 | 952 | 133 | 20 | 3 |
|---|---|---|---|---|---|---|
| Cycle-frequency | 1 | 2 | 3 | 4 | 5 | 6 |

TABLE 9

| Number of transients | | | | | | | |
|---|---|---|---|---|---|---|---|
| 21324 | 4726 | 941 | 179 | 25 | 7 | 1 |
| Transient-frequency 1 | 2 | 3 | 4 | 5 | 6 | 7 |

TABLE 10

| Number of orbits | 26010 | 3607 | 378 | 29 | 3 |
|---|---|---|---|---|---|
| Orbit-frequency | 1 | 2 | 3 | 4 | 5 |

Therefore, the results obtained with the PWLCM map in which N=32 bits are very close to the results obtained with the recursive filter having three delays in which N=11. The analytical rule: $\Delta_{nom} \cong \sqrt{(2^N)^3} = 2^{3N/2} = 2^{48}$ with N=32 for the recursive filter can be estimated by extrapolation from the experimental results, using the value $\Delta_{nom} \cong 2^{45}$. Therefore, the minimum length of the chaotic sequence output from the generating system 100 is $L_{min} > 7 \times 2^{128}$ samples. With this sequence, it is possible to encipher about $10^{32}$ different images each of size: $3 \times 1024 \times 1024 \times 32$ bits.

Therefore the experimental results described above show that the chaotic generator of the invention can be used with confidence in all applications related to data security.

What is claimed is:

1. A generator of chaotic sequences $e_u(n)$, n being a strictly positive integer, of integer values represented on a determined number of quantification bits N, to form data encrypting keys, the generator comprising:

at least two discrete recursive filters at least of first-order generating an output chaotic sequence of integer values, each recursive filter comprising means for implementing a nonlinear function F, connected via an exclusive-or gate to means for generating a perturbation sequence Q(n) of integer values represented on a determined number of quantification bits k, wherein the two filters are mounted in parallel, the chaotic sequence $e_u(n)$ output from the generator being equal to an exclusive-or of the chaotic sequences output from the recursive filters, and wherein the means for implementing the nonlinear function includes a chaotic map.

2. The generator of chaotic sequences according to claim 1, wherein the means for generating a perturbation sequence in each filter includes a maximum length feedback shift register using a primitive polynomial of degree k.

3. The generator of chaotic sequences according to claim 1 wherein the order of each recursive filter is third-order or lower.

4. The generator of chaotic sequences according to claim 1 wherein the means for implementing the nonlinear function includes a piece-wise linear chaotic map PWLCM.

5. The generator of chaotic sequences according to claim 3 wherein the sequences $e_{uj}(n)$ output from each recursive filter j=1,2 are given by the equation $$e_{uj}(n)=F(X_j(n-1),P) \oplus Q(n)$$

where:

$$F(X_j(n-1), P) = \begin{cases} \left\lfloor \dfrac{2^N \times X_j(n-1)}{P} \right\rfloor & 0 \leq X_j(n-1) \leq P \\ \left\lfloor \dfrac{2^N \times [X_j(n-1) - P]}{2^{N-1} - P} \right\rfloor & P \leq X_j(n-1) \leq 2^{N-1} \\ \left\lfloor \dfrac{2^N \times [2^N - 1 - X_j(n-1) - P]}{2^{N-1} - P} \right\rfloor & 2^{N-1} \leq X_j(n-1) \leq 2^N - P \\ \left\lfloor \dfrac{2^N \times [2^N - 1 - X_j(n-1)]}{P} \right\rfloor & 2^N - P \leq X_j(n-1) \leq 2^N \end{cases}$$

with $X_j(n-1) = \text{mod}$ $[k_{uj}(n-1) + c_{j1} \times e_{uj}(n-1) + c_{j2} \times e_{uj}(n-2) + c_{j3} \times e_{uj}(n-3), 2^N]$ where:
P is a control parameter whose value is less than $2^{N-1}$,
$k_{uj}(n)$ is the input sequence of the recursive filter j,
$c_{j1}, c_{j2}, c_{j3}$ represent the coefficients of the recursive filter j,
the operation $\lfloor X \rfloor$ consists of computing the largest integer equal to or smaller than X, the operation $\text{mod}(X, 2^N)$ consists of performing the modulo $2^N$ of X.

6. The generator of chaotic sequences according to claim 1 wherein the means for implementing the nonlinear function includes a chaotic map of SKEW-Tent type.

7. A system for generating chaotic sequences comprising at least one assembly of 14 generators of chaotic sequences according to claim 1, the generators being divided into two groups of 7 generators each, wherein the system comprises:

a first analogue multiplexer allowing a selection of an output of a first generator from among the generators of the first group;
a second analogue multiplexer allowing a selection of an output of a second generator from among the generators of the second group, the outputs of the two multiplexers being connected to an exclusive-or gate having an output that generates the chaotic sequence, and
means for addressing the multiplexers comprising a feedback shift register connected to a clock having a period that is a function of the length of the chaotic sequence.

8. The system for generating chaotic sequences according to claim 7, wherein the at least one assembly includes two assemblies, the first and second assembly being mounted in parallel, each assembly having 14 generators of chaotic sequences, the generated chaotic sequence output from the generating system being equal to an exclusive-or of the chaotic sequences generated at the outputs of the two assemblies of 14 generators.

9. The system for generating chaotic sequences according to claim 8, wherein primitive polynomials of the feedback shift registers of the first assembly of generators are different from primitive polynomials of the feedback shift registers of the second assembly of generators.

10. The system for generating chaotic sequences according to claim 7 further comprising means for eliminating a determined quantity of samples of chaotic sequences generated by the system.

11. The system for generating chaotic sequences according to claim 7 further comprising means for quantifying the generated chaotic sequences.

12. An encrypting system, comprising a system for generating chaotic sequences according to claim 7, the system for generating chaotic sequences being used for generating secret keys and in enciphering/deciphering procedures of the encryption system.

* * * * *